United States Patent [19]

Herrington

[11] 3,867,577

[45] Feb. 18, 1975

[54] AUTOMATIC SYSTEM FOR DIALING A CENTRAL TAXICAB DISPATCHING STATION

[76] Inventor: Donald Herrington, 3101 College Ave., Costa Mesa, Calif. 92626

[22] Filed: June 11, 1973

[21] Appl. No.: 368,880

[52] U.S. Cl. .................................................. 179/2 R

[51] Int. Cl. .......................................... H04m 11/00

[58] Field of Search ............. 179/6 D, 5 P, 100.2 S, 179/5.5, 2 R, 6 R

[56] References Cited

UNITED STATES PATENTS 3,461,241 7/1966 Menke ............................... 179/6 D 3,700,813 10/1972 Colman ............................... 189/5 P

*Primary Examiner*—William C. Cooper

*Assistant Examiner*—Tommy P. Chin

*Attorney, Agent, or Firm*—Sherman & Shalloway

[57] ABSTRACT

A system for automatically dialing a central taxicab dispatching station including a switch for energizing a tapedeck to automatically dial the central dispatching station or a telephone line and provide an audio message, preferably indicating location of a caller, and a transducer connected with the telephone line and operable to permit a caller to identify himself and his destination to the central dispatching station.

10 Claims, 2 Drawing Figures

AUTOMATIC SYSTEM FOR DIALING A CENTRAL TAXICAB DISPATCHING STATION

BACKGROUND OF THE INVENTION

1. Field of the Invention

The present invention pertains to taxicab dispatching systems and, more particularly, to a system for automatically dialing a central taxicab dispatching station.

2. Discussion of the Prior Art

In the past, taxicab companies have relied on customers telephoning in order to request dispatching of a taxicab to take them to a selected destination; however, such systems are inconvenient in that they require a customer to first determine the telephone number of the taxicab company, for instance by consulting a telephone directory, and then to manually dial the number. In order to overcome the inconvenience of dialing to request a taxicab, many companies have leased telephone lines to provide a direct telephone link between calling stations and a central dispatching station. The use of leased telephone lines, however, is relatively expensive; and, accordingly, leased lines are utilized only for very busy calling stations.

While automatic dialing systems are known for various applications, most prominently alarm systems and the like, such prior art automatic dialing systems do not lend themselves to the summoning of taxicabs in that they do not automatically identify a calling station and thereafter permit two-way communication between a caller and a central station. Furthermore, existing automatic telephone dialing apparatus and systems are relatively expensive due to complex circuitry and components required therefor; and, accordingly, such apparatus and systems have not been economically utilized for taxicab dispatching systems.

SUMMARY OF THE INVENTION

Accordingly, it is a primary object of the present invention to overcome the above-mentioned disadvantages of the prior art by providing apparatus for automatically dialing a central taxicab dispatching station on a telephone line, such apparatus being relatively inexpensive to produce and install.

Another object of the present invention is to eliminate the time wasted in summoning taxicabs to the same location several times a day.

An additional object of the present invention is to automatically dial a central taxicab dispatching station and identify the calling station prior to permitting two-way voice communication between the caller and the central taxicab dispatching station.

A further object of the present invention is to provide apparatus for automatically dialing a central taxicab dispatching station which is simple in operation and structure and inexpensive to produce and install.

Some of the advantages of the present invention over the prior art are that a caller wishing to summon a taxicab need merely press a button to automatically communicate with a central taxicab dispatching station, the apparatus is sufficiently inexpensive to permit installation at randomly frequented calling stations, the apparatus permits two-way voice communication between a caller and a central taxicab dispatching station, and the apparatus can be easily installed and serviced.

The present invention is generally characterized in apparatus for automatically dialing a central taxicab dispatching station on a telephone line including a recorder having a tape for storing a dial signal corresponding to pulses for dialing the central taxicab dispatching station, a line seizing signal for seizing the telephone line and an audio message, a relay circuit coupled with the pick-up means for supplying the line seizing and delay signals to the telephone line, a transformer coupled with the pick-up means for supplying the audio message to the telephone line and to permit audio communication between a caller and the central taxicab dispatching station, switch means for operating the recorder when actuated by a caller to supply the line seizing and dial signals to the relay circuit to establish communication with the central taxicab dispatching station and to supply the audio message to the transformer for communication to the central taxicab dispatching station, and a transducer coupled with the transformer to permit the caller to hear audio messages from the central taxicab dispatching station and to supply audio messages to the central taxicab dispatching station whereby by actuating the switch means the central taxicab dispatching station is automatically dialed, the audio message is automatically communicated to the central taxicab dispatching station and two-way communication between the caller and the central taxicab dispatching station is automatically established.

Other objects and advantages of the present invention will become apparent from the following description of the preferred embodiment taken in conjunction with the accompanying drawings.

DESCRIPTION OF THE PREFERRED EMBODIMENT

Figures 1, 2:
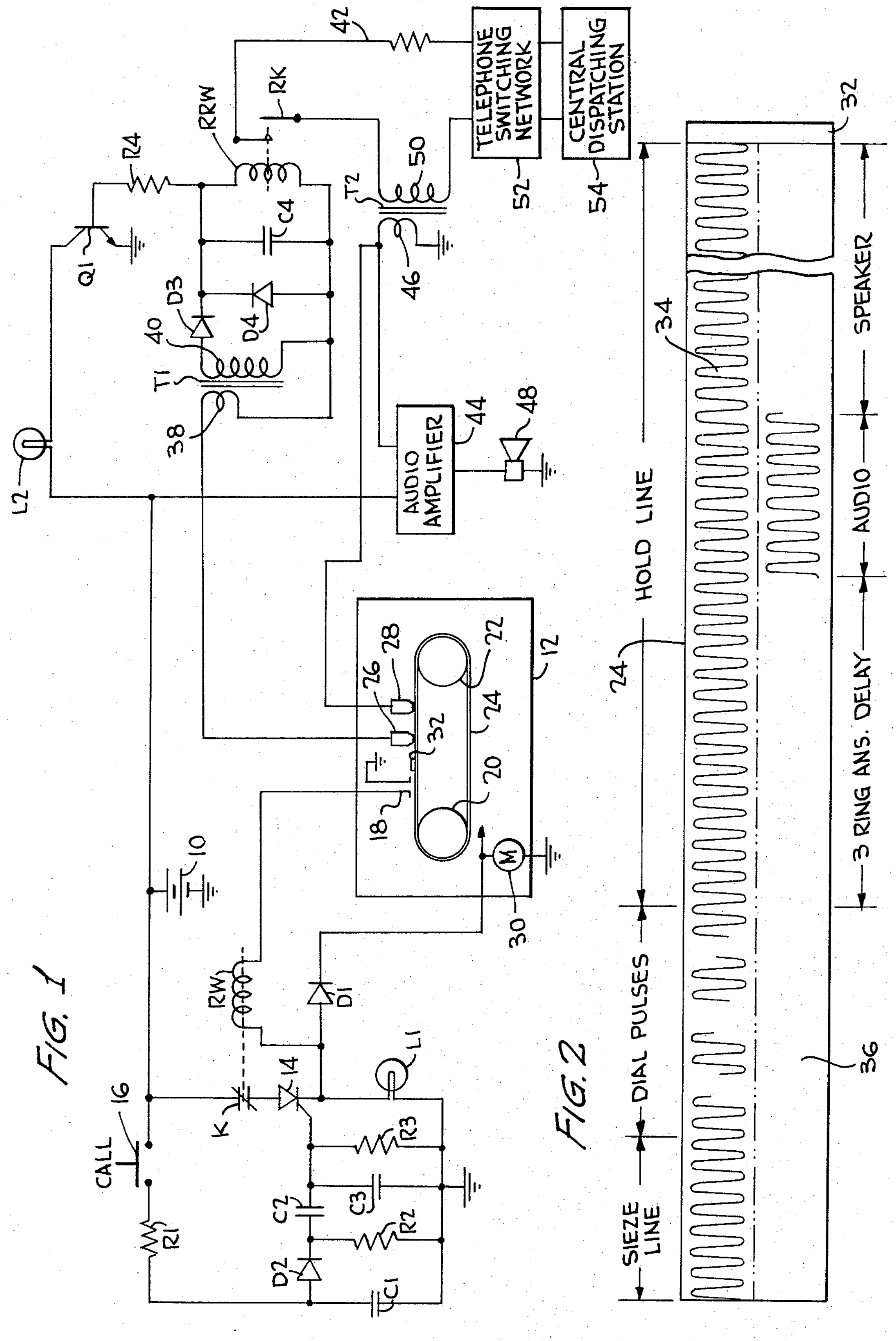
FIG. 1 is a schematic diagram of apparatus for automatically dialing a central taxicab dispatching station in accordance with the present invention.
FIG. 2 is a diagrammatic representation of a magnetic tape for use with the apparatus of FIG. 1.

Apparatus for automatically dialing a central taxicab dispatching station in accordance with the present invention is illustrated in FIG. 1 and includes a DC source of electricity 10, such as a 12 volt battery having its negative terminal grounded and its positive terminal connected to supply electricity to a tapedeck or recorder 12 through a pair of normally closed contacts K forming a stop switch, a controlled rectifier 14, such as an SCR, and a diode D1. A momentary, push-button call switch 16 is adapted to be depressed to connect the positive terminal of battery 10 through a resistor R1 to the junction between a capacitor C1 which is grounded at its opposite terminal and the anode of a diode D2, the cathode of diode D2 being connected to the junction between a resistor R2 having its opposite terminal grounded and a capacitor C2. The other terminal of capacitor C2 is connected to the gate of controlled rectifier 14, and a resistor R3 and a capacitor C3 are connected in parallel between the gate of controlled rectifier 14 and ground. The cathode of controlled rectifier 14 is connected to ground through a red lamp L1 as well as through diode D1 to the tapedeck 12 and through a relay winding RW and a pair of spaced contacts 18 to ground, the relay winding RW controlling normally closed contacts K.

The tapedeck 12 is a conventional tape recorder of the type having a pair of spindles 20 and 22 for receiving a tape cartridge and modified to move a continuous loop of magnetic tape 24 in the cartridge past pick-up heads 26 and 28. The spindles 20 and 22 are operated through a suitable mechanism, not shown, from a DC motor 30 receiving the positive voltage from battery 10 under the control of controlled rectifier 14, and the positive voltage is further supplied to provide bias voltage for the various components of the tapedeck 12. The tape 24 carries an electrically conductive strip 32 positioned so as to bridge the gap between spaced contacts 18 as it passes thereby.

The tape 24 has two tracks or channels 34 and 36 with channel 34 being aligned with pick-up head 26 and storing a constant frequency 2 KHz signal which is initially provided for a period of from 3 to 5 seconds to provide a line seizing signal to seize the telephone line followed by a dial signal formed by interruptions of the 2 KHz signal corresponding to pulses for dialing a central taxicab dispatching station and a constant 2 KHz signal for holding the telephone line. The second channel 36, which is aligned with pick-up head 28, stores an audio message to be sensed after the holding signal has been picked up for a sufficient period of time to permit three rings at the central taxicab dispatching station.

The output from pick-up head 26 is supplied to the primary 38 of a 4Ω to 1200Ω, 10 to 1 step-up transformer T1 which has a secondary winding 40 having its output halfwave rectified by a diode D3 and filtered by the parallel combination of a diode D4 and a capacitor C4 connected across a reed relay winding RRW controlling reed contacts RK connected in series with a telephone line 42. The cathode of diode D3 is also connected through a resistor R4 to the base of an NPN transistor Q1 which has its emitter grounded and its collector connected through a green lamp L2 to the positive terminal of battery 10. The positive terminal of battery 10 also supplies power to an audio amplifier 44 which is connected between a winding 46 of an 600Ω output impedance audio transformer T2 and a microphone-speaker transducer 48, the winding 46 also receiving the output from pick-up head 28 and the transformer T2 having winding 50 connected in series in the telephone line 42. The telephone line 42 is a conventional line of a telephone network and is adapted to be connected through a telephone switching network 52 to a central taxicab dispatching station 54 when dial pulses corresponding thereto are supplied to the telephone line.

In practice, the apparatus of FIG. 1 will be enclosed in a housing with push-button call switch 16 extending therefrom and the lamps L1 and L2 prominently displayed along with instructions for a caller. When a caller desires to summon a taxicab, push-button call switch 16 is momentarily depressed to provide a positive pulse to the gate of controlled rectifier 14 to trigger the controlled rectifier and provide positive voltage to provide power to operate the tapedeck 12 and to energize red lamp L1 to indicate to the caller that the tapedeck 12 is being supplied with power and the apparatus is in operation. The relay winding RW will initially remain deenergized due to the open state of spaced contacts 18.

When motor 30 in the tapedeck is energized, the magnetic tape 24 will be moved past the pick-up heads 26 and 28 such that, initially, pick-up head 26 will supply the 3 to 5 second, 2KHz line seizing signal to transformer T1, the 2 KHz being halfwave rectified to energize reed relay winding RRW and close reed contacts RK for a sufficient period of time to seize the telephone line 42 and obtain a dial tone. Once the telephone line 42 is seized, the ensuing dial pulses formed by interruptions of the 2 KHz signal alternately energize and deenergize the reed relay winding RRW to open and close the reed contacts RK and provide dial pulses on the telephone line 42 corresponding to the telephone number of the central taxicab dispatching station 54. Once the dial pulses have been supplied to the telephone line, the 2 KHz signal is continuously supplied to maintain reed contacts RK closed and hold the telephone line. After the telephone line is held for a period of time of about 10 seconds to permit at least three rings at the central taxicab dispatching station 54; and, after this delay has elapsed, the pre-recorded audio message from the channel 36 of the magnetic tape is supplied to the telephone line via pick-up head 28 and transformer T2, the audio message also being coupled from the telephone line and the transformer T2 to the transducer 48 such that the message can be heard by the caller.

When the initial line seizing signal is supplied to transformer T1, transistor Q1 will be rendered conductive to energize lamp L2, and while the dial pulses are supplied to the telephone line the lamp L2 will be similarly pulsed to indicate to the caller that dialing is taking place. Once dialing is completed, lamp L2 will be constantly energized by the 2 KHz holding signal to indicate to the caller that the call has been placed and that audio communication has been established.

Once the lamp L2 is constantly lit, if no pre-recorded message is stored on the magnetic tape, the caller merely indentifies himself, his location and his destination through transducer 48 and then any further communication desired between the caller and the central taxicab dispatching station can be accomplished. If the pre-recorded audio message is stored on the second channel of the magnetic tape, the caller can hear the same via transducer 48 and will not provide identification and destination or any other information until after the pre-recorded message has been completed.

The looped tape 24 has a length to provide sufficient time for the pre-recorded message and communication between the caller and the central taxicab dispatching station; and, once the loop 24 has been completed, the conductive strip 32 will bridge the gap between contacts 18 to permit relay winding RW to be energized to open contacts K which, in turn, will disconnect the battery 10 from the tapedeck 12 and render the controlled rectifier 14 non-conductive. With power from the battery 10 interrupted, the tapedeck 12 will stop operation, the lamps L1 and L2 will be deenergized and the relay winding RW will be deenergized to return the contacts K to their normally closed state in preparation for the next depression of the push-button call switch 16, the tape 24 being positioned such that another complete loop can be provided for the next phone call.

Inasmuch as the present invention is subject to many variations, modifications and changes in detail, it is intended that all subject matter described above or shown in the accompanying drawings be interpreted as illustrative and not in a limiting sense.

What is claimed is:

1. Apparatus for automatically dialing a central taxicab dispatching station on a telephone line comprising:

recorder means including tape means for storing a line seizing signal for seizing the telephone line, a dial signal corresponding to pulses for dialing the central taxicab dispatching station, a line holding signal and an audio message in parallel with said line holding signal, and pick-up means for supplying electrical signals corresponding to said line seizing and dial signals and said audio message;

relay circuit means coupled with said pick-up means for supplying said line seizing and dial signals to the telephone line;

transformer means coupled with said pick-up means for supplying said audio message to the telephone line and to permit audio communication between a caller and the central taxicab dispatching station;

switch means for operating said recorder means when actuated by a caller to supply said line seizing and dial signals to said relay circuit means to establish communication with the central taxicab dispatching station and to supply said audio message to said transformer means for communication to the central taxicab dispatching station; and transducer means coupled with said transformer means to permit the caller to hear audio messages from the central taxicab dispatching station and to supply audio messages to the central taxicab dispatching station whereby actuating said switch means, the central taxicab dispatching station is automatically dialed, said audio message is automatically communicated to the central taxicab dispatching station and two-way communication between the caller and the central taxicab dispatching station is automatically established.

2. Apparatus for automatically dialing a central taxicab dispatching station as recited in claim 1 wherein said transformer means is connected with said transducer means by circuit means such that said audio message from said recorder means can be heard by the caller.

3. Apparatus for automatically dialing a central taxicab dispatching station as recited in claim 1 wherein said tape means is a continuous loop of magnetic tape carrying an electrically conductive strip, and said switch means includes a pair of contacts spaced to be bridged by said conductive strip to stop operation of said recorder means.

4. Apparatus for automatically dialing a central taxicab dispatching station as recited in claim 3 wherein said switch means includes a DC battery, a controlled rectifier and a stop switch connected in series between said battery and said recorder means, and a call switch for triggering said controlled rectifier to supply electricity from said battery to operate said recorder means, said stop switch being opened in response to bridging of said spaced contacts by said conductive strip to interrupt the supply of electricity to said recorder means.

5. Apparatus for automatically dialing a central taxicab dispatching station as recited in claim 4 wherein said stop switch includes a pair of normally closed contacts and a relay winding energized by bridging of said spaced contacts to open said normally closed contacts.

6. Apparatus for automatically dialing a central taxicab dispatching station as recited in claim 5 wherein said switch means includes a lamp connected with said controlled rectifier to be lit when electricity is supplied to said recorder means.

7. Apparatus for automatically dialing a central taxicab dispatching station as recited in claim 6 wherein said relay circuit means includes a pair of reed contacts adapted to be connected in series in the telephone line, a reed relay winding controlling said reed contacts and energized by said line seizing and dial signals, and a lamp connected with said reed relay winding to be lit when said reed relay winding is energized.

8. Apparatus for automatically dialing a central taxicab dispatching station as recited in claim 7 wherein said magnetic tape has a first channel storing said line seizing and dial signals and a second channel storing said audio message, said line seizing signal being formed by a constant frequency signal extending along the entire length of said magnetic tape with the exception of interruptions forming said dial signal, said pick-up means includes a first pick-up head operable with said first channel and a second pick-up head operable with said second channel, said relay circuit means includes a step-up transformer and a rectifier connected between said first pick-up head and said reed relay winding, and said transformer means includes an audio transformer having a first winding adapted to be connected in the telephone line and a second winding connected with said second pick-up head and said transducer means.

9. Apparatus for automatically dialing a central taxicab dispatching station as recited in claim 1 wherein said relay circuit means includes a lamp connected to be lit by said line seizing and dial signals.

10. Apparatus for automatically dialing a central taxicab dispatching station as recited in claim 9 wherein said switch means includes a lamp connected to be lit while said recorder means is operated.

* * * * *